(12) United States Patent
Lawson

(10) Patent No.: US 6,523,994 B2
(45) Date of Patent: Feb. 25, 2003

(54) FOOD MIXER WITH SCREW-THREADED IMPELLER

(75) Inventor: Anthony Charles Lawson, Chiangmai (TH)

(73) Assignee: Tilia International, Inc., San Francisco, CA (US)

( * ) Notice: Subject to any disclaimer, the term of this patent is extended or adjusted under 35 U.S.C. 154(b) by 0 days.

(21) Appl. No.: 09/915,416

(22) Filed: Jul. 26, 2001

(65) Prior Publication Data

US 2002/0044496 A1 Apr. 18, 2002

Related U.S. Application Data

(63) Continuation of application No. 09/508,291, filed as application No. PCT/AU98/00734 on Sep. 9, 1998.

(30) Foreign Application Priority Data

Sep. 10, 1997 (AU) .............................................. PO9087

(51) Int. Cl.[7] .................................................. B01F 7/24
(52) U.S. Cl. ....................... 366/199; 366/319; 366/277; 366/317; 241/282.2
(58) Field of Search .......................... 241/278.1, 282.2; 366/206, 205, 286, 289, 314, 243, 278, 295, 199, 319, 277, 332

(56) References Cited

U.S. PATENT DOCUMENTS

| | | | |
|---|---|---|---|
| 2,162,348 A | * | 6/1939 | Hacmac |
| 2,757,909 A | * | 8/1956 | Wayne ..................... 241/282.2 |
| 3,744,767 A | * | 7/1973 | Blasnik |
| 3,892,365 A | | 7/1975 | Verdun |
| 4,127,342 A | | 11/1978 | Coggiola |
| 4,143,824 A | | 3/1979 | Shiotani |
| 4,173,310 A | | 11/1979 | Schaeffer |
| 4,194,697 A | | 3/1980 | Lembeck |
| 4,199,112 A | | 4/1980 | McLean |
| 4,216,917 A | | 8/1980 | Clare et al. |
| 4,277,995 A | | 7/1981 | Sontheimer |
| 4,297,038 A | | 10/1981 | Falkenbach |
| 4,309,823 A | | 1/1982 | Antolino et al. |
| 4,331,300 A | | 5/1982 | Hicks et al. |
| 4,371,118 A | | 2/1983 | Sontheimer et al. |
| 4,387,860 A | | 6/1983 | Necas et al. |
| 4,507,006 A | | 3/1985 | Golob et al. |
| 4,523,720 A | | 6/1985 | Behringer et al. |
| 4,540,128 A | | 9/1985 | Breeden |

(List continued on next page.)

FOREIGN PATENT DOCUMENTS

| | | |
|---|---|---|
| EP | 0 272 627 A2 | 6/1988 |
| EP | 0 272 627 A3 | 1/1989 |
| EP | 0 272 627 B1 | 5/1992 |
| EP | 0 963 726 A1 | 12/1999 |
| WO | WO 96/15706 | 5/1996 |
| WO | WO 98/20785 | 5/1998 |

*Primary Examiner*—Joseph W. Drodge
*Assistant Examiner*—Terry K. Cecil
(74) *Attorney, Agent, or Firm*—Fliesler Dubb Meyer & Lovejoy LLP

(57) ABSTRACT

A screw-threaded impeller 50 having a mixing device 55 thereon is provided in a container 10 of a food processor. A drive unit adjacent the bottom of the container is adapted to move the impeller in both a clockwise and a counterclockwise direction. During rotation, food placed within the container is lifted away from the mixing device when the impeller is rotated in one direction and is directed toward the mixing device when the impeller is rotated in the other direction. The mixing device includes a horizontal cutting blade 52 extending perpendicular to the impeller and a scooping blade 51 extending downwardly at an angle from the impeller. In order to lift over obstacles, the mixing device is spring mounted or can move along the helical protrusion toward the upper end of the impeller.

13 Claims, 2 Drawing Sheets

U.S. PATENT DOCUMENTS

| | | |
|---|---|---|
| 4,700,903 A | 10/1987 | Henn |
| 4,706,896 A | 11/1987 | Moon-Kau |
| 4,723,719 A * | 2/1988 | Williams ................ 241/282.2 |
| 4,733,607 A * | 3/1988 | Star et al. |
| 4,752,041 A | 6/1988 | Franke et al. |
| 4,799,626 A | 1/1989 | Hickel et al. |
| 4,984,747 A | 1/1991 | Lechner |
| 5,347,205 A | 9/1994 | Piland |
| 5,421,248 A | 6/1995 | Hsu |
| 5,454,299 A | 10/1995 | Gonneaud |
| 5,486,050 A | 1/1996 | Lenting |
| 5,727,742 A | 3/1998 | Lawson |
| 5,749,285 A | 5/1998 | Dörner et al. |
| 5,826,495 A * | 10/1998 | Yung et al. |
| 5,921,485 A | 7/1999 | Plavcan et al. |

\* cited by examiner

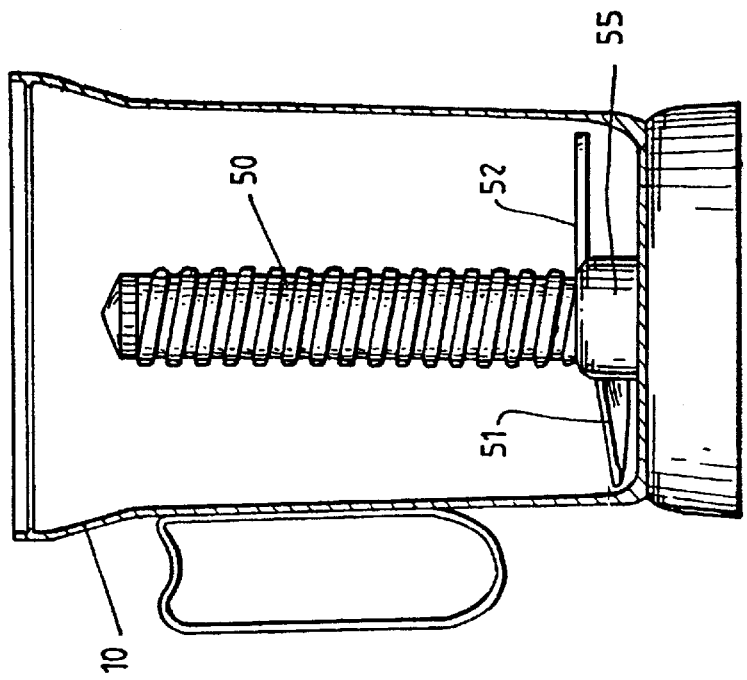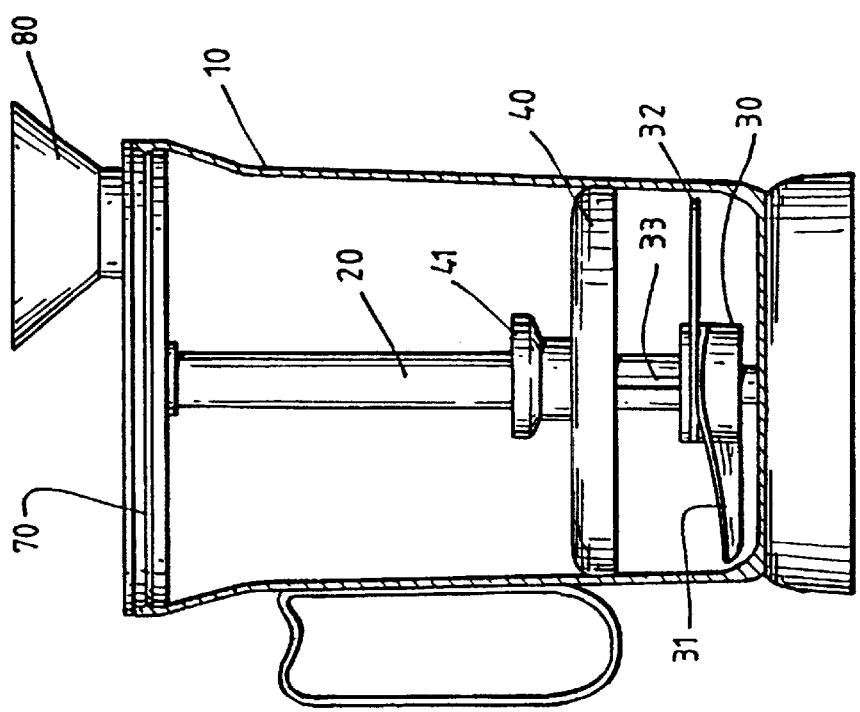

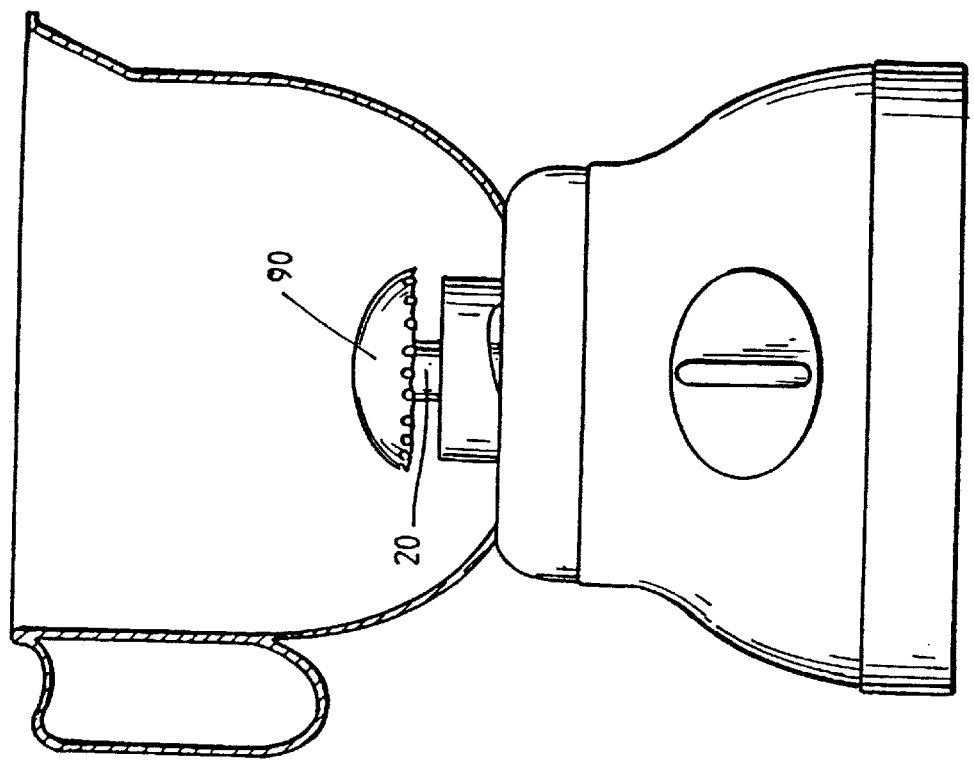
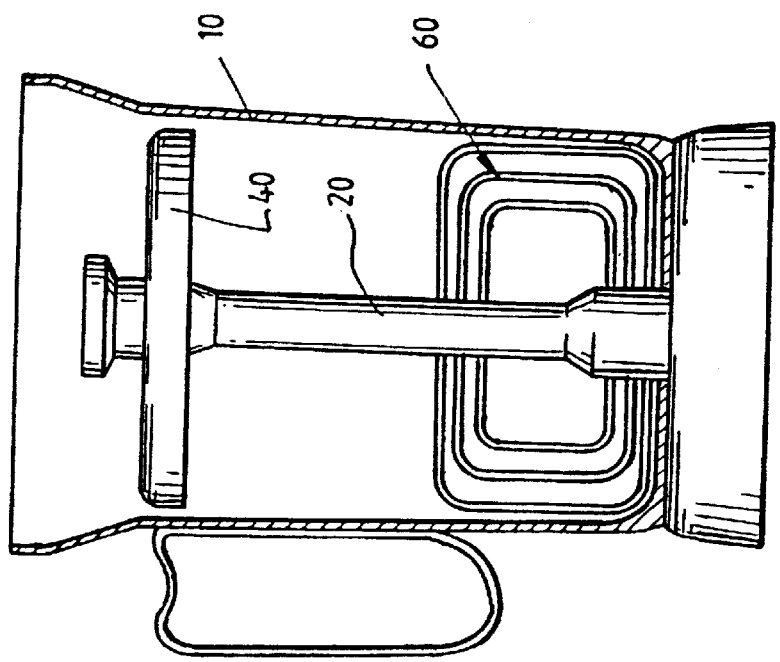

FOOD MIXER WITH SCREW-THREADED IMPELLER

"This application is a Continuation of Ser. No. 09/508,291, filed Mar. 30, 2000, which is a 371 of PCT/AU98/00734, filed Sep. 9, 1998."

This invention relates to the area of food processing and in particular to a food mixer or blender capable of carrying out various food processing functions more efficiently than previous such mixers.

BACKGROUND TO THE INVENTION

Most food mixers are based on pairs of beaters which rotate about parallel axes so that the beater heads inter-engage and the material being mixed tends to pass between the heads.

In some other applications, where heavier materials are being beaten or kneaded, a single blade is used and this blade may either be shaped as in a dough hook or have a surface which is open and through and around which the material being mixed passes. Such mixers and blenders however are usually not particularly efficient at breaking up flour lumps and such like and do not homogenise mixtures in a safe and splash free way. In particular most mixers do not readily blend small amounts of substances such as mayonnaise.

Most mixers also become sluggish in their movement as more ingredients are added and the contents of the mixer become more viscous. Additionally, chopper type blades in such mixers tend to have a crushing effect on materials added, such as chocolate chips, and do not provide an even consistency.

It is an object of this invention to provide a mixer which permits effective mixing of food products while minimising the problems outlined above.

OUTLINE OF THE INVENTION

The mixer of the invention uses a single impeller, rather than the twin beater concept, which is adapted to drive various mixing devices as appropriate.

The invention in its broadest sense is a food mixer which includes a container having an impeller adapted to be driven by drive means adjacent the lower surface of the container and which impeller is adapted both to cooperate with various mixing devices and to rotate in either the clockwise or anti-clockwise direction.

It is preferred that the impeller be centrally mounted within a substantially symmetrical container however the container itself may be of any desired shape. It is also preferred that the impeller be able to be driven in both the clockwise and anti-clockwise directions.

In one embodiment of the invention it may be preferred that the impeller is a relatively short tubular shaped member with a mixing member attached thereto with the upper end of the impeller being provided with a dome shaped cap with a dimpled or serrated lower surface which aids in breaking up food lumps remaining once the food has been cut, or otherwise processed, and which also helps reduce the possibility of contact between implements inserted in the container and any cutting means used. This cap also assists in minimising splash and enhancing the lateral spread of ingredients during mixing.

It is however preferred that the mixer be provided with central impeller shafts which may extend up to any height in the container and which can be provided with mixing or other devices as required.

In order that the invention may be more readily understood embodiments of it by way of non limiting example will be described here with reference to the following diagrams:

FIG. 1 shows the invention fitted with a hybrid chopper device and an interior lid to adjust for different quantities of foodstuffs;

FIG. 2 shows an embodiment of the invention with a threaded central impeller and a mixing device;

FIG. 3 shows an embodiment of the invention in which the impeller is provided with a whisking device and an inside lid;

FIG. 4 shows an embodiment of the invention in which the impeller is fitted with a cap which may shield a cutting or mixing device below it;

Considering first the embodiment of the invention shown in FIG. 1. A container 10 is provided with a central impeller shaft 20 which can be driven from below the lower surface of the substantially cylindrical container 10. A hybrid chopper/blade device 30 is also provided which can be passed over the central shaft until adjacent the lower face of the container.

While in general the central impeller shaft may extend up to any height inside the container in this embodiment it extends the full height of the container which may be closed with an optional lid 70 if it is desired that a funnelled opening 80 be provided for the insertion of food material.

The arrangement of the chopper/blade assembly 30 is such that a preferably plastic scooping blade 31 extends at an angle to the vertical from the centre of one side of the device and terminates at the container edge, the lower edge of the blade 31 being parallel to and just slightly above the lower inside edge of the container.

On the opposite side of the impeller shaft from the scooping blade the device is provided with an essentially horizontal preferably arcuate shaped chopping blade 32, preferably of metal, which in a preferred embodiment has a face which cuts or chops when the impeller shaft is rotated clockwise but does not chop when it is rotated anticlockwise.

The sense of rotation is not however a restriction on the inventive concept nor need the blade be sharp on only one side and it is envisaged that a useful embodiment of the invention may be provided by a cutting action when the rotation was in reverse.

This combination of a scooping blade 31 used in combination with a chopping blade 32 dramatically improves the mixer's ability to cut hard vegetables evenly.

If it is desired that aeration be provided as well as mixing the blades described can either be roughened in some manner or be perforated with holes. In practice I have found the latter method to produce the best results.

It is also envisaged that the mixing and chopping blades of this invention be able, if required, to move up and down the central shaft by way of a groove 33 in the shaft, with the chopper assembly's up and down movement being largely determined by the sense of rotation of the impeller, or be located at different heights within the container by fixing the mixing assembly being used at some chosen height via the use of at least one fastening device locating on the central shaft.

The chopper/blade assembly 30 is preferably used (as shown in FIG. 1) in combination with a deflector disc 40 which can be slid down over the impeller shaft above the chopper blade.

This deflector disc 40 is basically an annulus which covers the internal area of the container and acts as an effective inside lid.

The arrangement is such that the hub 41 of the disc is slid over the upper part of the impeller in sufficient proximity to the impeller to allow the deflector disc to be oriented at right angles to the container wall while freely allowing the impeller shaft 20 to rotate within a central aperture in the hub and the disc. This aperture needs to be sufficiently large to avoid any grooves on the impeller shaft.

Vertical grooves are provided in the interior wall of the central portion of the hub to allow for the release of any pressure build-up under the deflector disc when blending hot ingredients. This feature also allows the user to drain off any excess liquid from a mixture without first having to remove the contents.

The function of the deflector disc is that it restricts the ingredients to be mixed to the lower part of the container and prevents them being spread to areas of the container where they cannot be further processed.

This action is particularly useful when a mixture of liquids and solids is being blended and prevents splashing. In addition it acts to deflect food particles flung up by the scooper blade into the path of the cutter blade and directs them back down to the cutter blade again.

It may also be preferred that the underside of the deflector disc be serrated or otherwise roughened to further aid in breaking up lumps of food.

Although the deflector disc can be made from any appropriate material, in this preferred embodiment it is made of a transparent material so that the contents of the mixer are not obscured.

The perimeter of the disc may also be provided with a rim of silicone rubber or other appropriate material to maintain close contact with the container wall if that is desired, alternately it may be a loose fit as shown in FIG. 3 to allow food material to pass into the lower part of the container or to allow the disc to "float" above the food material being mixed while the weight of the hub could act to confine the ingredients to the minimum space required.

Whatever method is used) the disc, while fitting firmly within the container, should still be able to move in the vertical sufficiently to accommodate expansion of the mixture being processed.

Although the deflector disc used in combination with the chopper blade is highly efficient, certain combinations of ingredients can still bind together in such a way that they Ad deposit in positions within the container which avoid the blades. For this reason the direction of rotation of the chopper blade combination is able to be reversed, preferably slowly, so that the contents of the mixer can be agitated or stirred without being chopped. This feature is desirable not only for providing even mixing but for stirring in additional material when no further chopping action is required.

In a further embodiment of the invention (FIG. 2) a scoop/paddle device 55 is provided which comprises a set of plastic mixing paddles. These are similar in shape to the chopper/blade device previously described however the essentially horizontal "blade" 52 is symmetrical about its centerline and the scooping paddle 51 is quite flexible to allow doughs, and other mixes which may become compacted, to pass beneath it. It is also further envisaged that the assembly could be spring mounted so as to lift over obstacles.

In this embodiment of the invention the scoop/paddle device 55 is located about a spiral threaded screw impeller device 50 such that when the impeller is driven clockwise there is a downward screwing action on the material, or dough, being kneaded such that the dough is gently forced down onto the paddles causing it to roll around the container between its walls and the central impeller and provide gentle kneading.

While various devices can be used in conjunction with the spiral impeller it has been my experience that, when the spiral impeller is driven through an epicyclic gear set at about 300 rpm, its motion is sufficiently slow as to not damage implements or fingers which may be inserted into the container and also that there is no need for a lid to contain the dough.

In this embodiment of the invention the scoop/paddle device functions in two ways dependant on the sense of rotation of the impeller.

When running in a counterclockwise direction the ingredients are lifted into the path of the essentially horizontal paddle 52 thus aerating flour and such and evenly distributing fat into the mixture for light fluffy pastries.

With conventionally shaped blades some mixtures have a tendency to compact in such a way that the blades cease to have any effect. However, when the impeller of the invention is driven in a counterclockwise direction the mixture is churned up and the mixing action resumes.

The sense of rotation could of course be reversed using a non conventionally threaded impeller however the above described arrangement is preferred.

In a further embodiment of the invention shown in FIG. 3 a central impeller 20 is provided with whisk devices 60 which are used for light mixture whipping of food materials such as egg whites. In this embodiment it is preferred that the disc 40 (or inner lid) be used to assist in spreading the food ingredients laterally and to help prevent splashing.

Another embodiment of the invention (FIG. 4) provides a short impeller 20, which may be provided with any mixing device at its base, at the top of which is a dome shaped cap 90 which has several functions. One of these is to cover any food processing device and protect it from contact with implements inserted into the container. Another is to aid in the lateral spread of food products being processed.

Another feature of this cap 90 is that its lower face is dimpled or serrated in order to aid in the breaking up of lumps of food once that food has been otherwise processed.

It can be seen that there are many possible applications for the concept of the invention and that, while I have described herein various embodiments of the invention, any combination or variation in the features of the invention previously described lie within the concept of the invention.

What is claimed is:

1. A food mixer comprising:
   (a) a container having a bottom end and an open top end;
   (b) a drive means adjacent the bottom end;
   (c) a rotatable impeller vertically positioned within the container and including a first end engaging the drive means, a second end extending toward the container top end, and a helical thread extending from the first end to the second end on an outer surface of the impeller; and
   (d) a spring mounted mixing device positioned on the impeller and adapted to move vertically toward said second end to lift over obstacles while rotating with the impeller, wherein the drive means is adapted to rotate the impeller in both a first direction and a second direction opposite the first direction, and further wherein food placed within the container is lifted away from the mixing device when the impeller is rotated in the first direction and is directed toward the mixing device when the impeller is rotated in the second direction.

2. The food mixer of claim 1 wherein the impeller is a substantially cylindrically shaped member mounted within the container which is substantially symmetrically shaped.

3. The food mixer of claim 1, wherein the mixing device is a scoop/paddle device located on the impeller adjacent to a lower surface of the container.

4. The food mixer of claim 3, wherein the scoop/paddle device can rotate along the helical thread of the impeller.

5. An accessory for a food processing device, comprising:

(a) a rotatable, cylindrical impeller including a first end, a second end and a helical threaded protrusion extending from the first end to the second end on an outer surface of the impeller, wherein the first end is adapted to engage a drive at the bottom of a container of the food processing device when the impeller is vertically positioned therein; and (b) a spring mounted mixing device positioned on the impeller and adapted to move vertically toward said second end to lift over obstacles while rotating with the impeller, the mixing device including a horizontal cutting blade extending perpendicular to the impeller and a scooping blade extending at an angle from the impeller, wherein the impeller is adapted to be rotated in both a clockwise and a counterclockwise direction by the food processing device, such that food placed within the container is lifted away from the mixing device when the impeller is rotated in one of the clockwise direction and the counterclockwise direction and is directed toward the mixing device when the impeller is rotated in the other of the counterclockwise direction and the clockwise direction.

6. The accessory of claim 5, wherein the scooping blade is flexible to allow food which may be compacted to pass therebeneath.

7. A food processing device, comprising:

a base housing having a motor and motor controls;

a bidirectional drive unit coupled with the motor;

a container, selectively interlocked with the base housing, so that the drive unit protrudes into the container;

a lid adapted to interlock with the container; and an accessory, having a rotatable, cylindrical impeller including a first end, a second end and a helical threaded protrusion extending from the first end to the second end on an outer surface of the impeller, wherein the first end is adapted to engage the drive unit at a bottom of the container of the processing device when the impeller is vertically position therein; and a spring mounted mixing device positioned on the impeller and adapted to move vertically toward said second end to lift over obstacles while rotating with the impeller, the mixing device including a horizontal cutting blade extending perpendicular to the impeller and a scooping blade extending at an angle from the impeller.

8. A food processing device as recited in claim 7, wherein a bottom surface of the cylindrical impeller has a cavity to engage the drive unit.

9. A food processing device as recited in claim 7, wherein the helical threaded protrusion is adapted to create a downward screwing action upon food being kneaded such that the food is forced onto the cutting blade and the scooping blade when the cylindrical impeller rotates in a first direction.

10. A device as recited in claim 7, wherein the helical threaded protrusion is adapted to create a lifting and aerating action upon food being processed when the cylindrical impeller rotates in a first direction.

11. A food mixer comprising:

(a) a container having a bottom and an open top end;

(b) a drive means adjacent the bottom end;

(c) a rotatable impeller vertically positioned within the container and including a first end engaging the drive means, a second end extending toward the container top end, and a helical thread extending from the first end to the second end on an outer surface of the impeller; and (d) a mixing device positioned on the impeller, said mixing device being adapted to move vertically toward said second end and along said helical thread to lift over obstacles while rotating about the impeller, wherein the drive means is adapted to rotate the impeller in both a first direction and a second direction opposite the first direction, and further wherein food placed within the container is urged away from the mixing device when the impeller is rotated in the first direction and is directed toward the mixing device when the impeller is rotated in the second direction.

12. An accessory for a food processing device, comprising:

(a) a rotatable, cylindrical impeller including a first end, a second end and a helical threaded protrusion extending from the first end to the second end on an outer surface of the impeller, wherein the first end is adapted to engage a drive at the bottom of a container of the food processing device when the impeller is vertically position therein; and (b) a spring mounted mixing device positioned on the impeller, at least a portion of said mixing device being adapted to move vertically toward said second end to lift over obstacles while rotating with the impeller, the mixing device including a horizontal cutting blade extending perpendicular to the impeller and a scooping blade extending downwardly at an angle from the impeller, said scooping blade being flexible and having a high portion and a low portion adapted to scoop under food, wherein the impeller is adapted to be rotated in both a clockwise and a counterclockwise direction by the food processing device, such that food placed within the container is lifted away from the mixing device when the impeller is rotated in one of the clockwise direction and the counterclockwise direction and is directed toward the mixing device when the impeller is rotated in the other of the counterclockwise direction and the clockwise direction.

13. A food processing device, comprising:

a base housing having a motor and motor controls;

a bidirectional drive unit coupled with the motor;

a container, that can be selectively interlocked with the base housing, so that the drive unit protrudes into the container;

a lid adapted to interlock with the container; and an accessory, having a rotatable, cylindrical impeller including a first end, a second end and a helical threaded protrusion extending from the first end to the second end on an outer surface of the impeller, wherein the first end is adapted to engage the drive at the bottom of the container of the processing device when the impeller is vertically position therein; and a spring mounted mixing device positioned on the impeller, at least a portion of said mixing device being adapted to move vertically toward said second end to lift over food while rotating with the impeller, the mixing device including a horizontal cutting blade extending perpendicular to the impeller and a scooping blade extending downwardly at an angle from the impeller, said scooping blade being flexible and having a high portion and a low portion adapted to scoop under food.

* * * * *

UNITED STATES PATENT AND TRADEMARK OFFICE
CERTIFICATE OF CORRECTION

PATENT NO.     : 6,523,994 B2
DATED          : February 25, 2003
INVENTOR(S)    : Anthony Charles Lawson It is certified that error appears in the above-identified patent and that said Letters Patent is hereby corrected as shown below:

<u>Title page,</u>
Item [57], ABSTRACT,
Line 2, remove "food processor" and add -- food mixer/processor --.

<u>Column 5,</u>
Line 56, remove "position" and add -- positioned --

Signed and Sealed this

Twenty-second Day of July, 2003

JAMES E. ROGAN
*Director of the United States Patent and Trademark Office*